US010741014B2

(12) United States Patent
Kramer et al.

(10) Patent No.: US 10,741,014 B2
(45) Date of Patent: Aug. 11, 2020

(54) ADJUSTABLE PRIZE CHUTE

(71) Applicants: Glenn Kramer, Lakewood, NJ (US); Steven J Paris, Lakewood, NJ (US)

(72) Inventors: Glenn Kramer, Lakewood, NJ (US); Steven J Paris, Lakewood, NJ (US)

( * ) Notice: Subject to any disclaimer, the term of this patent is extended or adjusted under 35 U.S.C. 154(b) by 0 days.

(21) Appl. No.: 15/849,326

(22) Filed: Dec. 20, 2017

(65) Prior Publication Data

US 2018/0182206 A1 Jun. 28, 2018

Related U.S. Application Data

(60) Provisional application No. 62/438,481, filed on Dec. 23, 2016.

(51) Int. Cl.
*B65G 11/00* (2006.01)
*G07F 17/32* (2006.01)
*A63F 9/30* (2006.01)
*B07B 13/16* (2006.01)

(52) U.S. Cl.
CPC ............ *G07F 17/3223* (2013.01); *A63F 9/30* (2013.01); *G07F 17/3297* (2013.01); *B07B 13/16* (2013.01)

(58) Field of Classification Search
CPC ....... B65G 11/00; B65G 11/123; B65G 11/10; B65G 11/103; B65G 11/12; B65B 39/007; B65B 59/00; B65D 21/086; B65D 21/08; B65D 21/083; B65D 11/18; A63F 9/30; B07B 13/16; G07F 17/3223; G07F 17/3297
USPC .......................... 193/25 C, 25 E, 25 S, 25 R
See application file for complete search history.

(56) References Cited

U.S. PATENT DOCUMENTS

| | | | | | |
|---|---|---|---|---|---|
| 1,587,348 | A * | 6/1926 | Myers | A01K 1/0613 | 119/849 |
| 1,664,465 | A * | 4/1928 | Purchas | A47B 88/90 | 160/225 |
| 2,664,258 | A * | 12/1953 | Lanier | B65D 21/08 | 248/172 |
| 4,184,602 | A * | 1/1980 | Moliard | B65D 21/08 | 160/229.1 |
| 4,273,395 | A * | 6/1981 | Martinez | H05K 5/0004 | 312/205 |
| 5,887,782 | A * | 3/1999 | Mueller | B65D 5/0227 | 229/117 |
| 6,257,442 | B1 * | 7/2001 | Fredmark | B65D 21/086 | 220/9.4 |
| 8,567,163 | B2 * | 10/2013 | Præstholm | B30B 9/3014 | 53/257 |
| 9,789,985 | B2 * | 10/2017 | Winkler | B65B 35/50 | |
| 2014/0001134 | A1 * | 1/2014 | Merey | A47B 97/00 | 211/86.01 |
| 2015/0353232 | A1 * | 12/2015 | Kandel | A47G 23/06 | 220/574 |
| 2017/0320627 | A1 * | 11/2017 | Molander | B65D 21/068 | |
| 2018/0327138 | A1 * | 11/2018 | Englert | B65D 11/1833 | |

* cited by examiner

*Primary Examiner* — Raleigh W Chiu
(74) *Attorney, Agent, or Firm* — White-Welker & Welker, LLC; Matthew T. Welker, Esq.

(57) ABSTRACT

A crane or claw machine in combination with an adjustable prize chute. The prize chute having four inner panels and four corner panels movable with respect to each other. A groove allows for the adjusting and repositioning of the panels for smaller or larger chute sizes. A pivot allows for adjustment of the panels with respect to each other, enlarging or shrinking the size of the chute.

3 Claims, 8 Drawing Sheets

ADJUSTABLE PRIZE CHUTE

CROSS REFERENCE TO RELATED APPLICATIONS

This application claims priority from U.S. Patent Application Ser. 62/438,481, entitled "Crane Machine with Adjustable Prize Chute", filed on Dec. 23, 2016. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to an amusement machine. More specifically, the present invention relates to a crane and claw amusement machine.

BACKGROUND OF THE INVENTION

Skill cranes have been in use for many years wherein a plurality of various prizes are contained within a cabinet having a claw mechanism contained therein, and actuated by a person outside of the cabinet, whereby an attempt is made to grasp and retrieve one of the prizes from the cabinet within a predetermined period of time.

A claw crane (also called a variety of other names, such as claw machine) is a type of arcade game known as a merchandiser, commonly found in video arcades, supermarkets, restaurants, movie theaters, shopping malls, and bowling alleys.

A claw crane consists of many parts, but the basic components are a printed circuit board (PCB), power supply, currency detector, credit/timer display, joystick, wiring harness, bridge assembly, and claw. The claw has two or more fingers, although most claws have three.

The cabinet is usually constructed of medium-density fiberboard (MDF). Some cabinets are made of aluminum alloy, which makes it easier to relocate as well as cheaper to produce. The window at the front of the machine is normally made of glass or a cheaper-to-manufacture substitute, such as acrylic. The marquee is a branded graphic (sometimes created specifically for restaurants or an operator's business name) behind a PLEXIGLASS front.

A claw vending machine consists of prizes, usually plush toys or alternatives such as jewelry, capsuled toys, hats, balls, dolls, shirts, candy and electronics. More expensive prizes are sometimes placed in a plastic bag so the toy is harder to pick up. The player inserts money or tokens into the machine, which then allows the player to manipulate a joystick that controls the claw for a variable amount of time, (controlled by the operator) usually 30 seconds, and rarely even a minute. The player is able to move the claw back, forth, and sideways. Some machines allow the user to move the claw after it has partially descended.

At the end of the play time (or earlier if the player presses a trigger button on the joystick), the claw descends and makes an attempt to grip. After making the gripping attempt, the claw then moves over an opening in the corner of the case and releases its contents. If the player is successful, then the prize the claw is holding is dropped into the opening and dispensed through a chute into a hatch for collection.

An alternative version of the machine, popular in arcades, is the two button version: one marked with a forward arrow, one with a right arrow. The crane starts near the front, left side of the machine and the user presses first the forward button to move the crane towards the back of the cabinet. Once the button is released the crane stops moving and the button cannot be used again, thus requiring the user to judge depth accurately in one attempt. After this, the right button becomes active in a similar way and as soon as it is released, the crane drops to a certain depth and then raises, closing its claw on the way and returning to the drop hatch in the front left corner. These versions are generally considered to be more difficult. The button type machines typically do not feature the timers which are commonly found on joystick type machines.

The success rate of winning a prize is dependent on several factors including operator settings, player skill, type of machine, and the prizes available (size, density, and distribution). A prize may be lost due to player inexperience, player error in manipulating the claw, the weakness of the claw, or the specific crane configuration. Many modern cranes use a computer to determine an expected payout percentage based on the operator's settings. All modern claw machines incorporate some means for the owner to adjust at least the strength of the claw's grip and how closely the claw's fingers pull together, usually with screws on the mechanism or potentiometers on the PCB.

Even on older machines, the grip strength can be adjusted by adding circuit components or additional hardware. Some machines incorporate a feature called two-level claw power, which, when enabled, causes the claw to at first grip at full strength, but then gradually weaken its grip to the normal level after a brief delay. This can cause the crane to initially pick up the prize, but then drop it.

Modern claw machines are fully computerized and are remotely programmable by the owner (via a hand-held device). Settings and features commonly available include: Claw strength and aperture; Motion speed, in any direction (that is, the claw can be made to drop slowly but come up quickly, or move right faster than it moves forward); Pick-up strength and retain strength can be specified separately, as well as the delay between pick-up and return.

Currently there is no claw or crane machine known that uses an adjustable prize chute as one of the factors in controlling payout and the amount of skill required to win a prize.

SUMMARY OF THE INVENTION

The present invention teaches a crane or claw machine in combination with an adjustable prize chute. The prize chute is comprised of four inner panels and four corner panels. A groove allows for the repositioning of panels for smaller or larger chute sizes. A pivot allows for adjustment of the panels with respect to each other, enlarging or shrinking the size of the chute.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
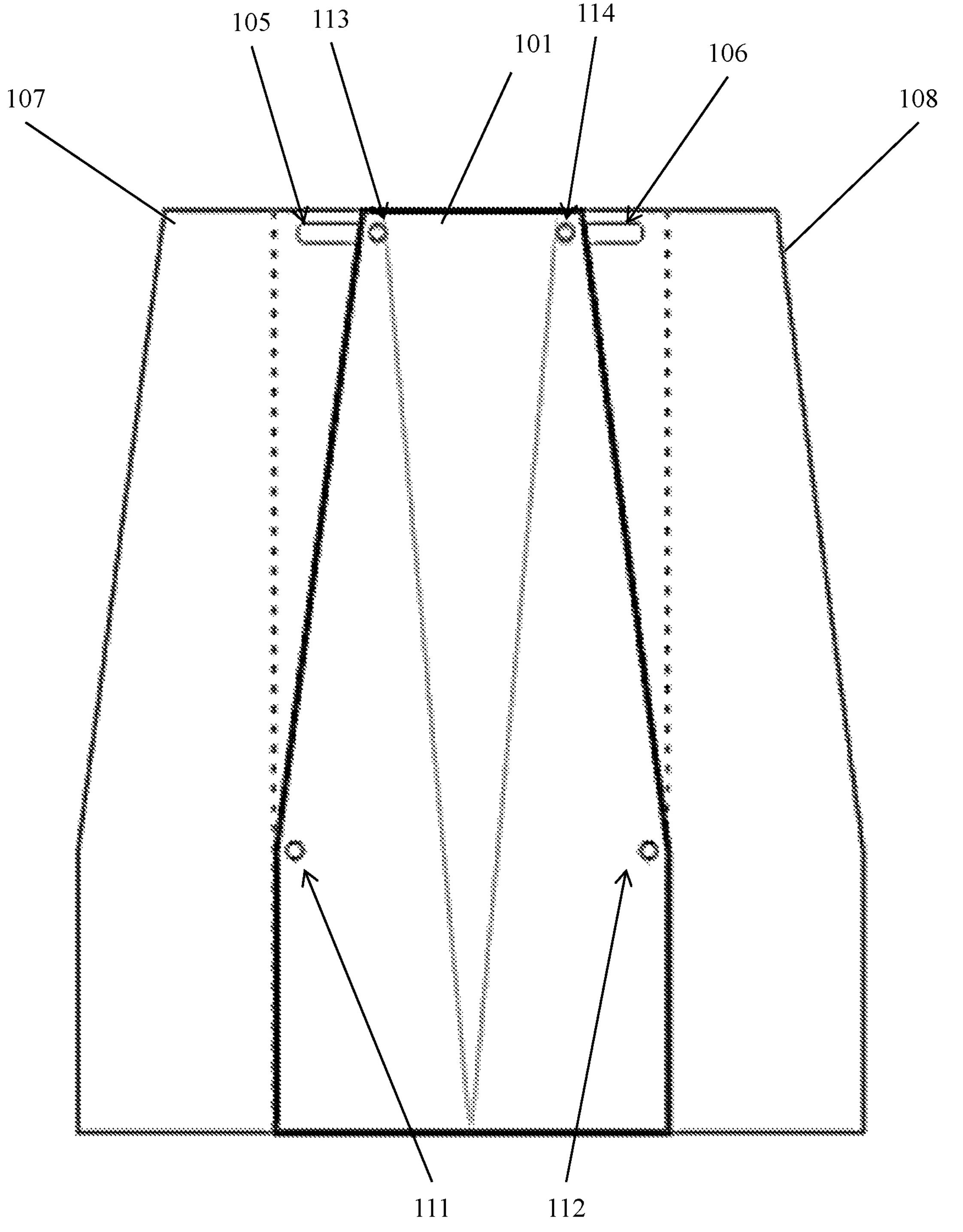
FIGS. 1-3 are images of the inner and corner panels as they can be moved with respect to each other to create an open and a closed position which corresponds to an enlarged or a reduced prize chute opening.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Skill cranes and other amusement vending machines are typically found in retail locations where children are present. Such locations often include grocery stores, theme restaurants, game arcades, and the like.

Conventional skill crane games typically include a transparent cabinet that holds a plurality of prizes, such as stuffed toy animals, capsulated items, candy, etc. A movable claw or other grasping device is positioned inside the cabinet, and is operably connected to a joystick mounted on the outside of the cabinet. After inserting the required amount of money, the player attempts to grab a prize by moving the open claw into position with the joystick and releasing it. If the player has skillfully positioned the claw over the desired toy or prize, then the claw will descend onto the toy and grasp it. The claw then transfers the toy to an outlet chute from which the player can retrieve the toy. With all the toys mixed together in a pile, however, it is often difficult for the player to determine exactly which toy the claw is hovering over before dropping the claw. As a result, the player is often unsuccessful at grabbing a toy.

Some skill crane games limit the amount of time the player has to grab a prize. If the player does not grab a prize in the given time, then the player must insert more money into the machine for continued play. Other skill crane games give the player a single opportunity to drop the claws over a desired toy in an attempt to grasp a prize. If the player is unsuccessful, then the player must insert additional money for continued attempts. Given the difficulty of grabbing a toy on the first or second try, many players become discouraged by these game formats and do not return to play the game again.

Although a specific embodiment of a game machine with a grabber is described here, the skilled person will appreciate that the measures of the invention are also applicable to any other game machine in which other game means are provided in a cabinet or housing, wherein it is for instance possible to envisage coin and token games and games of skill.

The Cabinet consists essentially of a front wall, two side walls, a rear wall, an upper wall, and a bottom. Front wall here consists essentially of an upper transparent panel, a lower translucent panel. Each side wall likewise comprises an upper transparent panel. A typical cabinet for a crane, claw, or prize machine is also equipped with a prize chute where the prize, picked from a playing field by a crane, claw, or other apparatus is then deposited into a top opening of a prize chute for delivery to a prize dispensing location at an opposing end of the prize chute.

Figure 5:
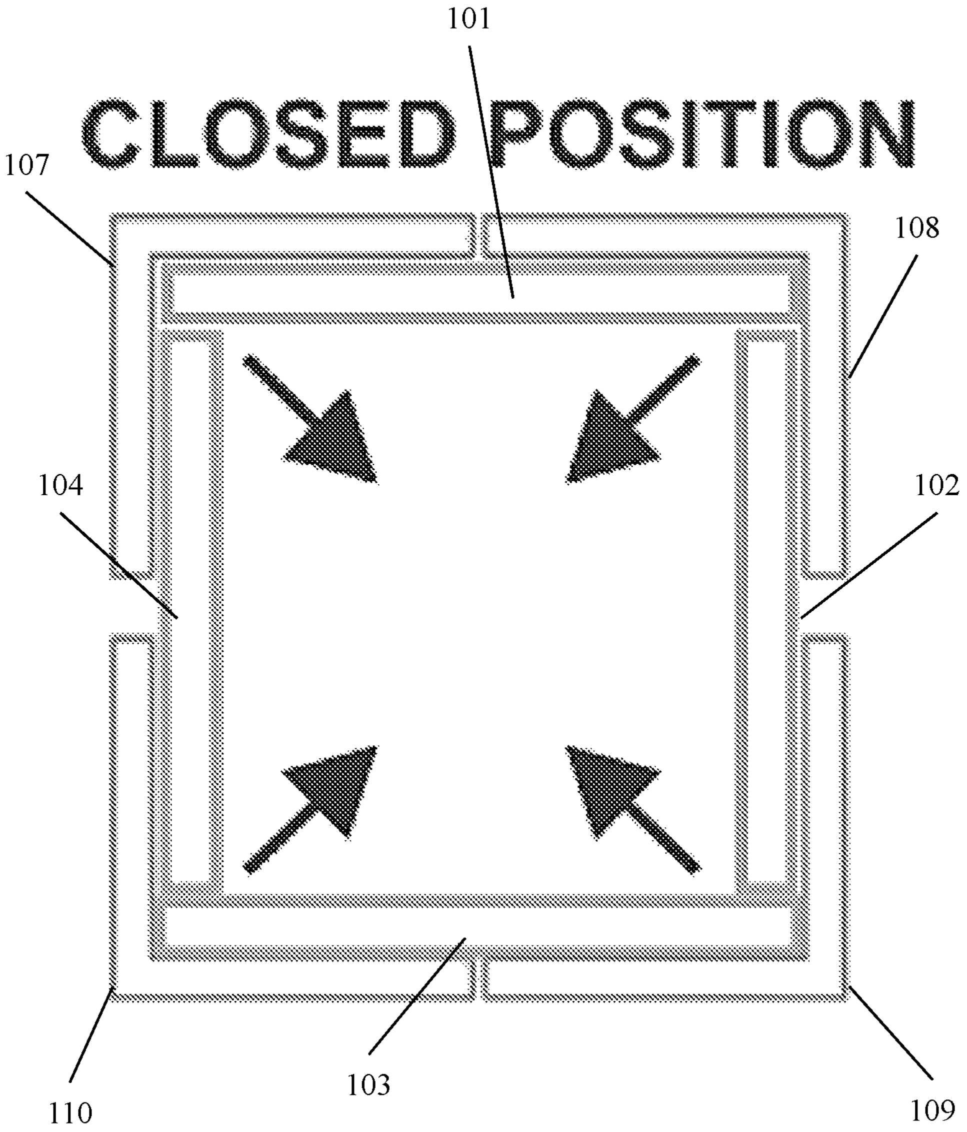
FIG. 5 is an image of the inner and corner panels as they can be moved with respect to each other to create an open position.

Now referring to Figures, the adjustable prize chute of the present invention is shown. The adjustable prize chute, in one embodiment, is part of a crane or claw machine. The prize cute consist of four inner panels 101, 102, 103, 104 and four corner panels 107, 108, 109, and 110 as shown in FIGS. 5-6.

Referring to FIGS. 1-3 and 7-8, a plurality of grooves 105 106 in the corner panels 107, 108, 109, and 110 and a plurality of corresponding pivots 113 and 114 on the inner panels 101, 102, 103, 104 allows for the repositioning of the panels for smaller or larger chute sizes. The grooves 105 and 106 in the corner panels allows them to slide together and away from the inner panels 101, 102, 103, 104 with the inner panel pivots 113 and 114 providing guidance for the sliding motion as shown in FIGS. 4-5.

Figure 2:
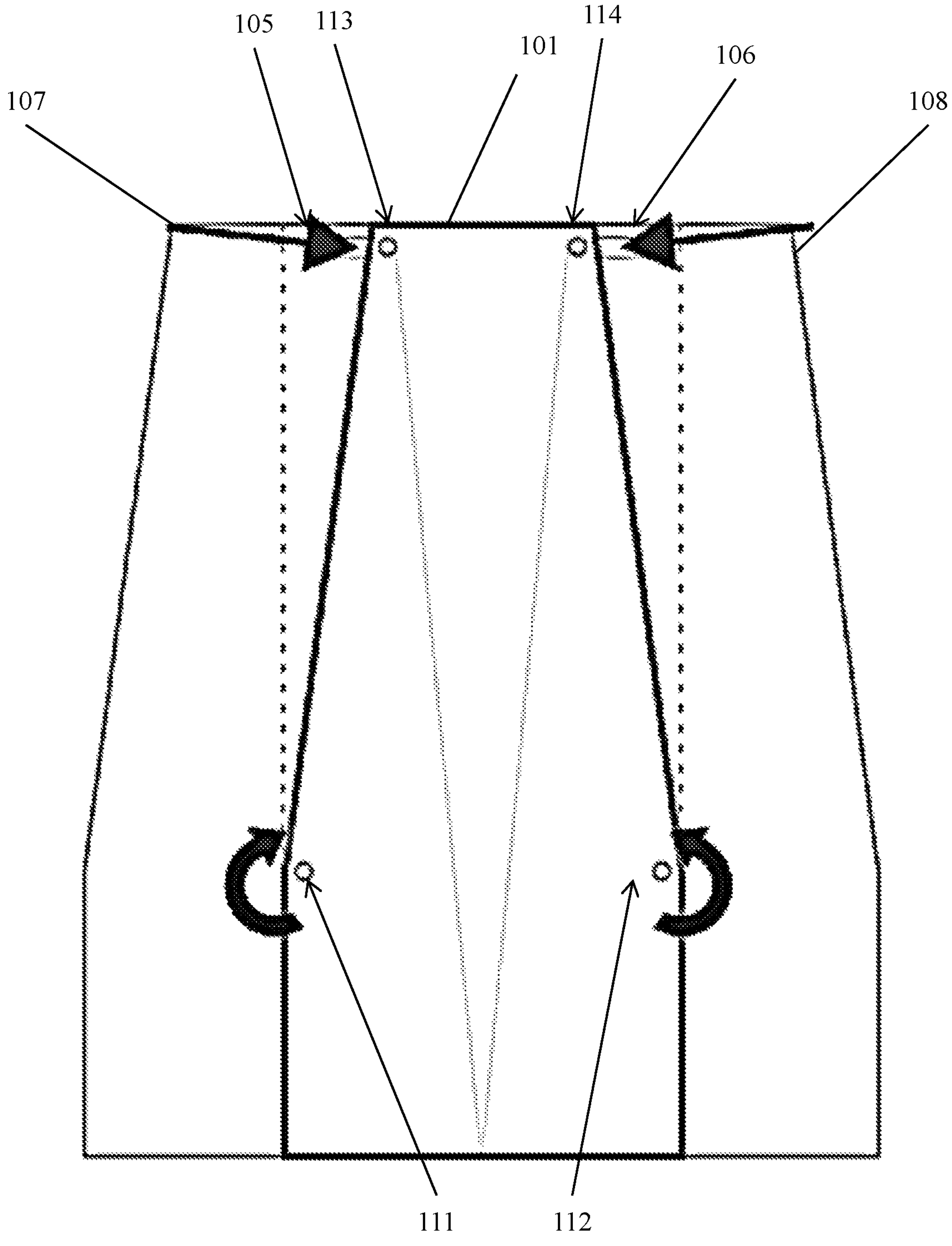
Figure 3:
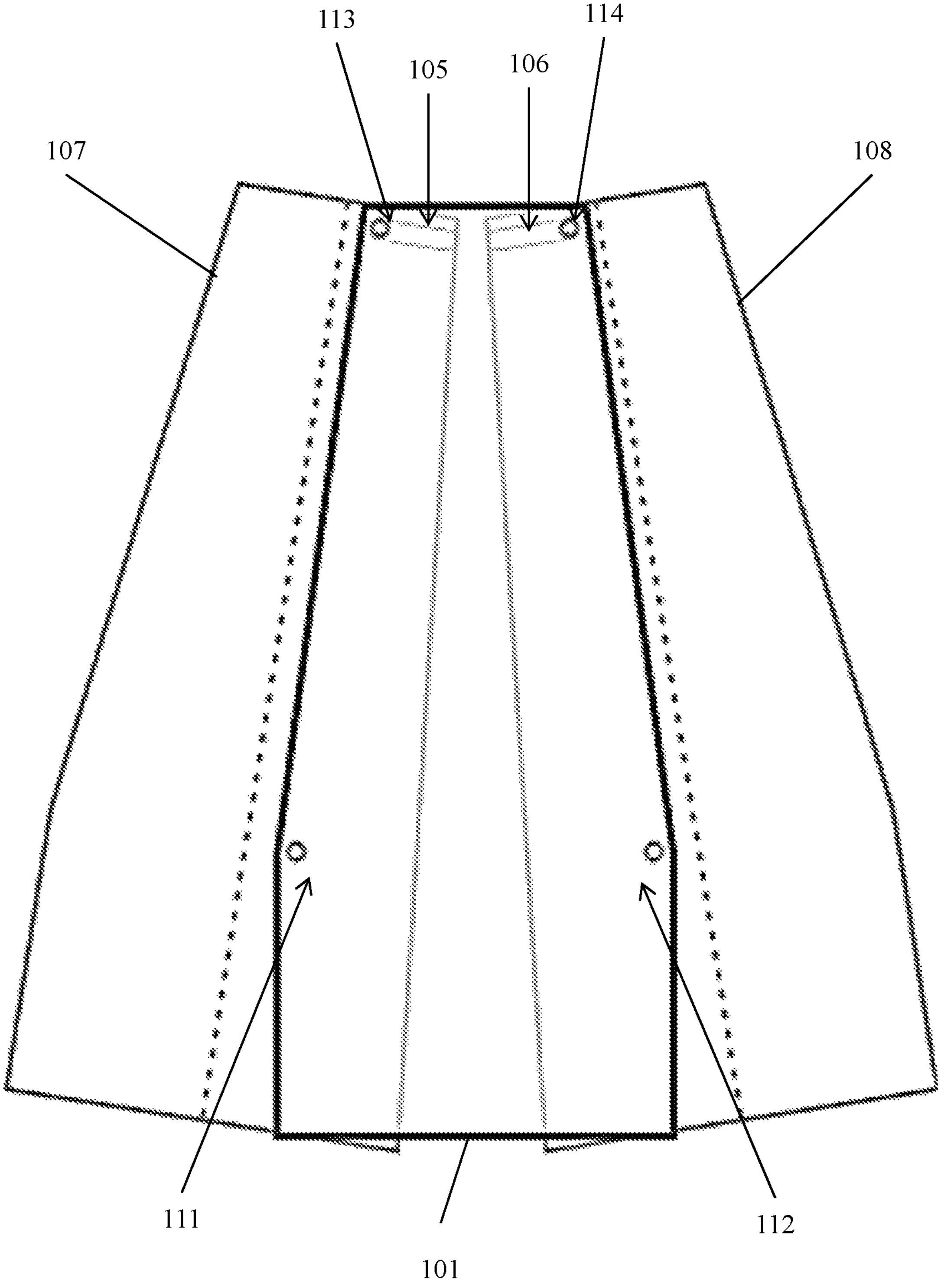

A second set of pivot points 111 and 112 allows the lower portion 115 of the corner panels to fan out or collapse in and straighten out in a closed position as shown in FIGS. 2-3. This allows the prize cute to maintain a complete enclosure with no gaps or openings as moves or transitions between open and close positions as shown in FIGS. 4-5.

Figure 6:
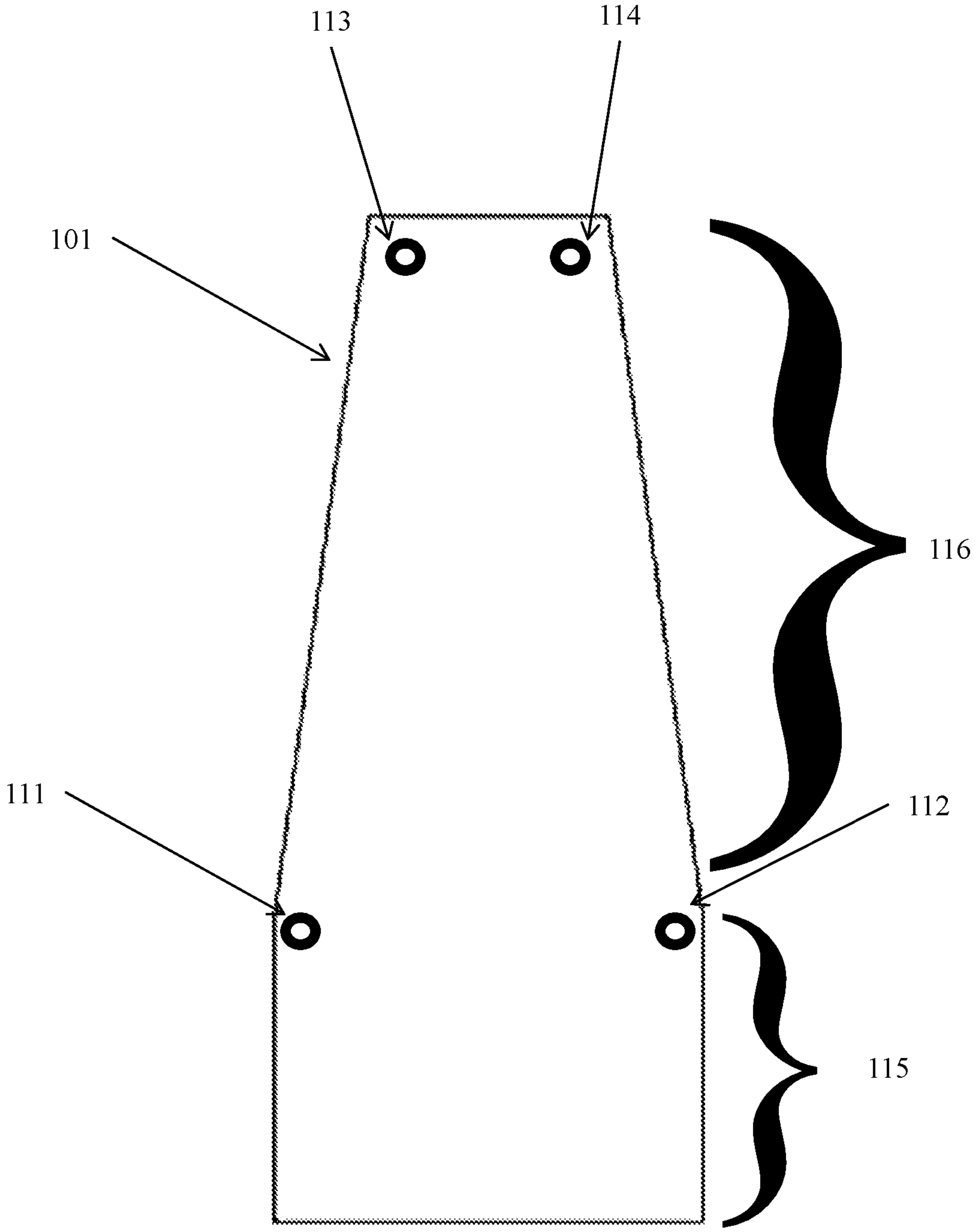
FIG. 6 is an image of an inner panel used by the present invention.
Figure 7:
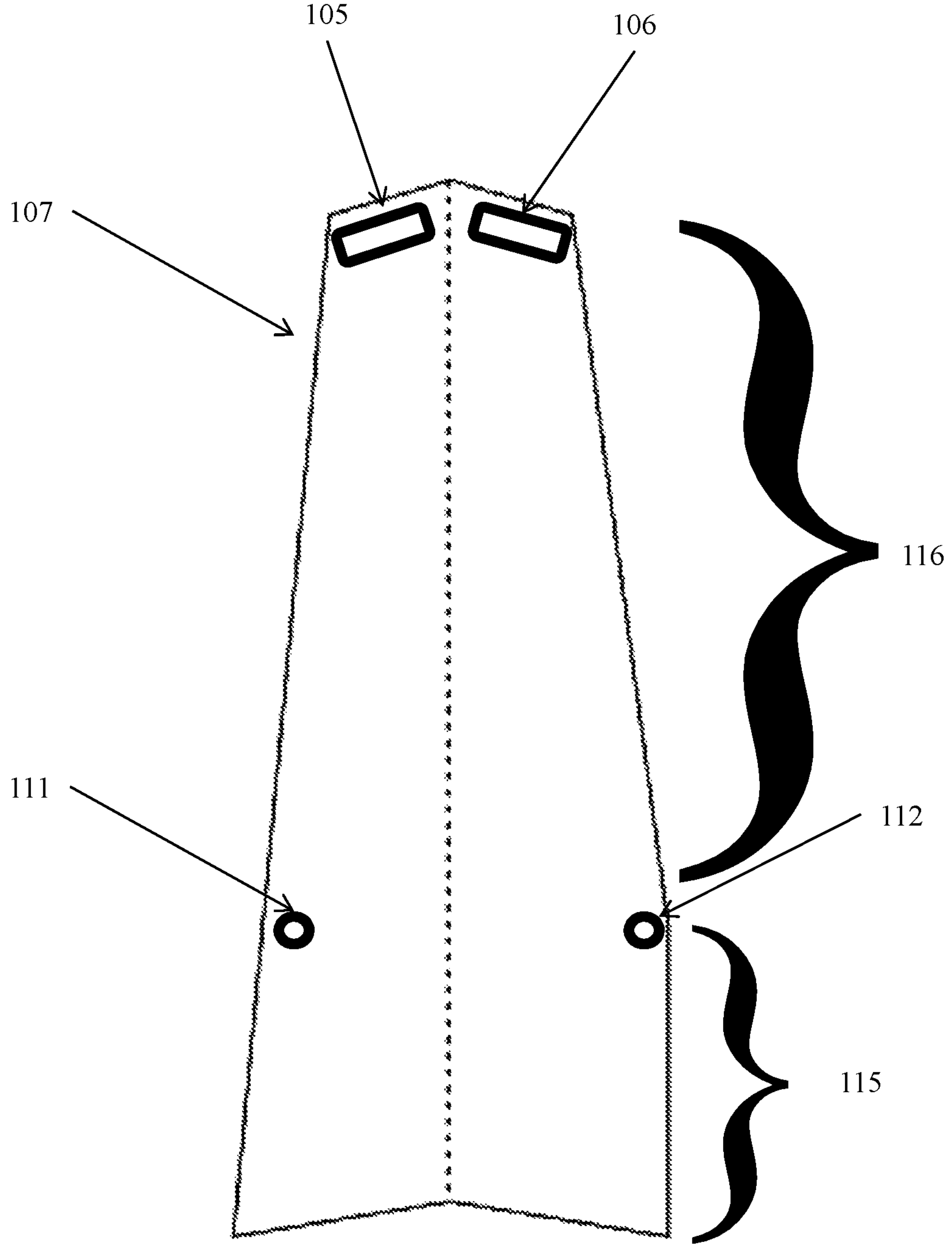
FIGS. 7-8 are images of a corner panel used by the present invention.
Figure 8:
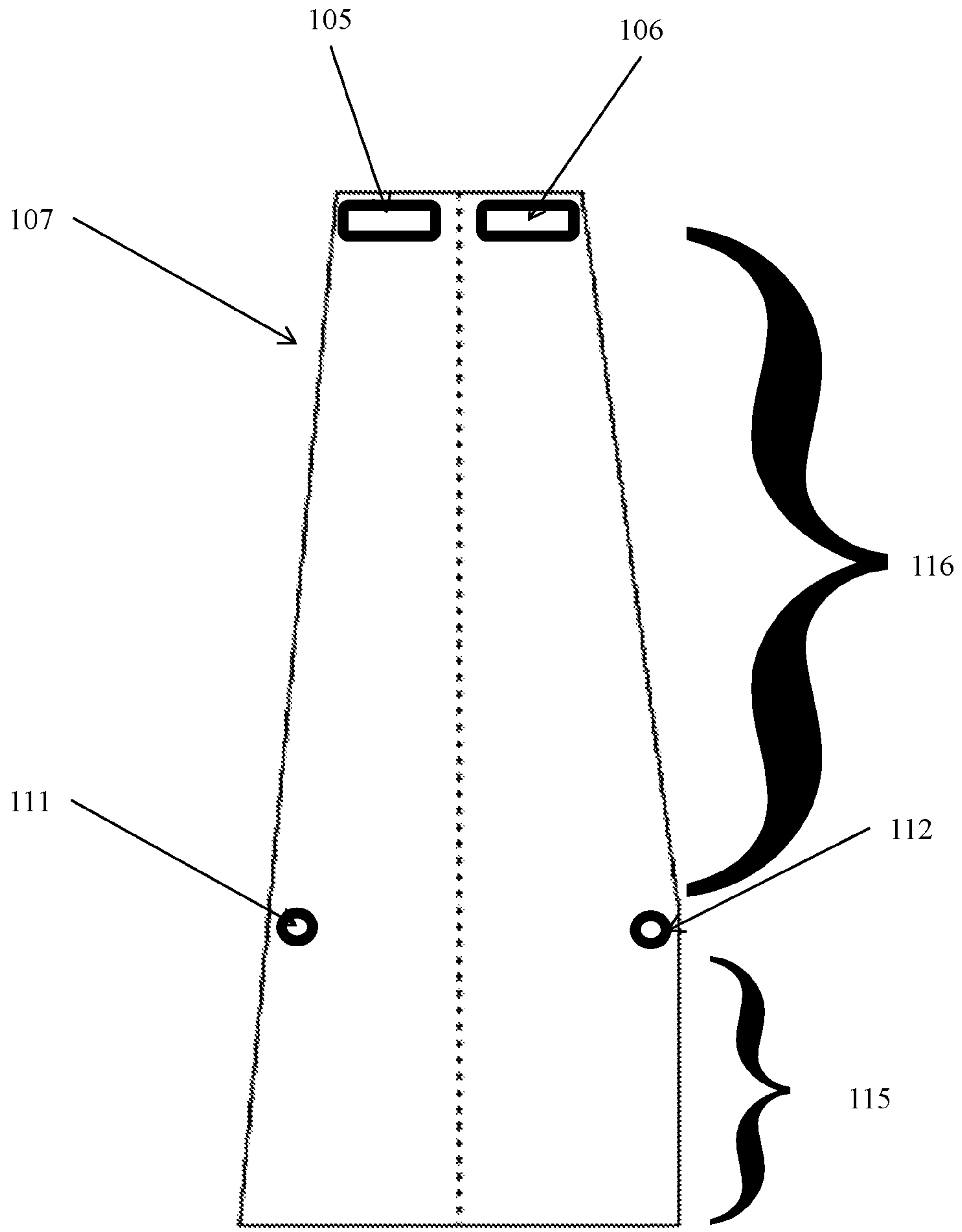

Now referring to FIGS. 6-8, the shape of the panels is not that of a rectangle and is similar to that of a hexagon as shown in FIG. 6, a hexagon as shown in FIG. 7, and a pentagon as shown in FIG. 8. In one embodiment, the panels can be quadrilateral in shape. In another embodiment, like those depicted in FIGS. 6-8, the shape of the panels can include a square or rectangular lower portion 115, which combines the shape of a quadrilateral top section 116 as shown in FIG. 6, a pentagonal top section 116 as shown in FIG. 7, or a quadrilateral top section 116 as shown in FIG. 8 with a square or rectangular lower section 115, to create the pentagonal or hexagonal shape of the panel as illustrated in FIGS. 6-8.

Figure 4:
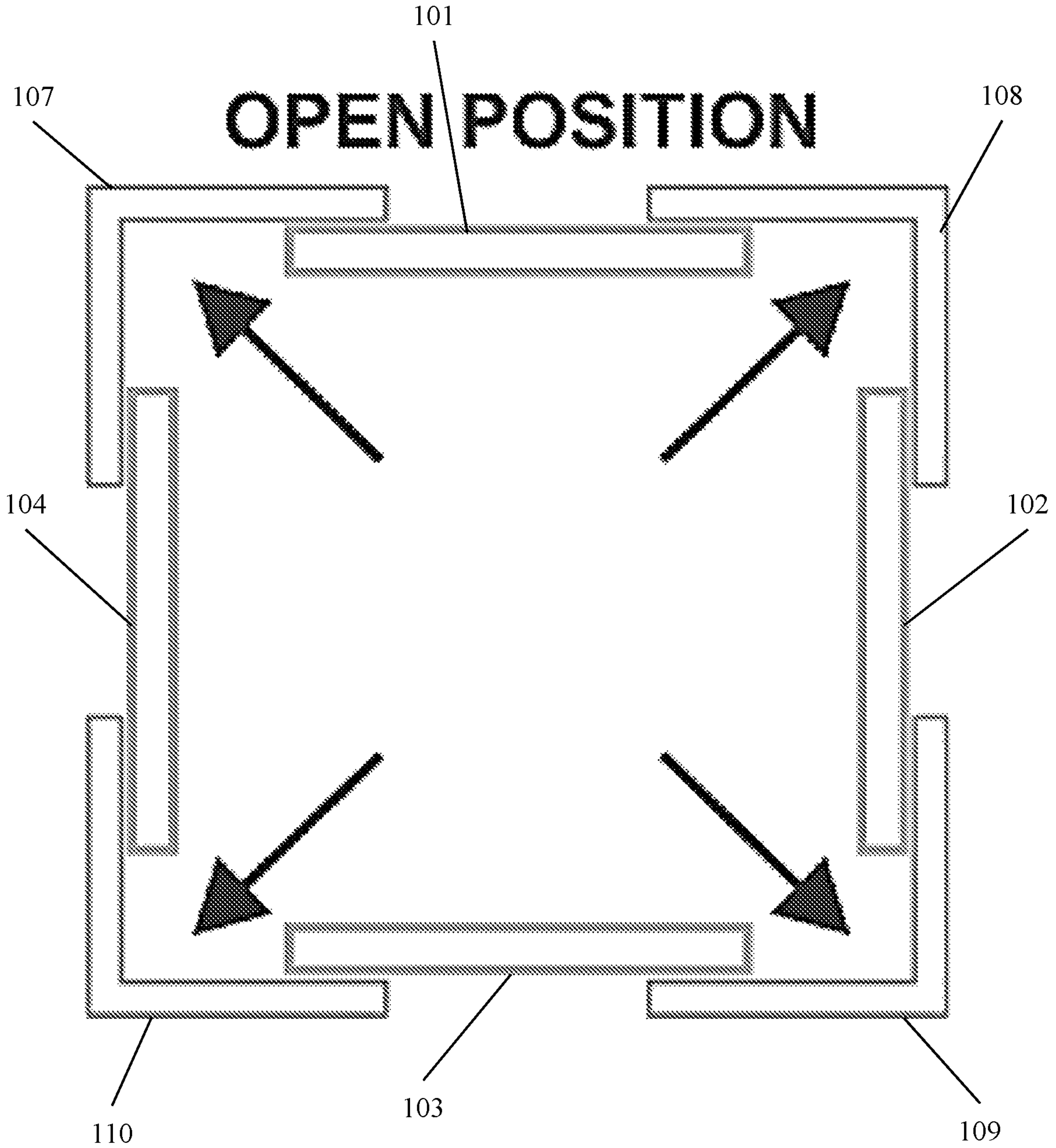
FIG. 4 is an image of the inner and corner panels as they can be moved with respect to each other to create an open position.

The shape of the panels is critical to the repositioning of the panels between open and closed positions depicted in FIGS. 4-5 and the ability to maintain a chute that has no openings, edges, corners, etc. where prizes could be lost or get hung up, resulting in a blocked or clogged prize chute, possibly rendering the machine unplayable.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An adjustable prize chute, comprising four inner panels;

four corner panels;

the panels connected and repositionable;

the corner panels are further comprised of a plurality of grooves;

the inner panels are further comprised of a plurality of pivots;

the plurality of grooves in the corner panels and the plurality of pivots on the inner panels allows for the repositioning of the panels for smaller or larger chute sizes;

the grooves in the corner panels allows them to slide together and away from the inner panels with the inner panel pivot providing guidance for the sliding motion; and the plurality of pivot points allows the lower portion of the corner panels to fan out or collapse in and straighten out in a closed position.

2. The adjustable prize chute of claim 1, wherein the panels are quadrilateral in shape.

3. The adjustable prize chute of claim 1, wherein the shape of the panels combines the shape of a quadrilateral or pentagonal top section with a square or rectangle lower section resulting in a panel with either a pentagonal or hexagonal shape.

* * * * *